(12) United States Patent
Cordier et al.

(10) Patent No.: US 7,453,048 B2
(45) Date of Patent: Nov. 18, 2008

(54) DIRECTION CHANGE DEVICE FOR MOTOR VEHICLE

(75) Inventors: Emmanuel Cordier, Grendelbruch (FR); Claude Simon, Plobsheim (FR)

(73) Assignee: Delphi Technologies, Inc., Troy, MI (US)

( * ) Notice: Subject to any disclaimer, the term of this patent is extended or adjusted under 35 U.S.C. 154(b) by 112 days.

(21) Appl. No.: 11/545,309

(22) Filed: Oct. 10, 2006

(65) Prior Publication Data
US 2007/0095803 A1 May 3, 2007

(30) Foreign Application Priority Data
Oct. 10, 2005 (EP) .................... 05360040

(51) Int. Cl.
*H01H 3/16* (2006.01)
(52) U.S. Cl. ................. 200/61.3; 200/61.27; 200/61.54
(58) Field of Classification Search ............. 200/61.27, 200/61.28, 61.3–61.38, 61.54–61.57
See application file for complete search history.

(56) References Cited

U.S. PATENT DOCUMENTS

| 3,953,706 | A | | 4/1976 | Harris et al. |
| 5,259,262 | A | * | 11/1993 | DuRocher et al. .............. 74/462 |
| 5,265,487 | A | * | 11/1993 | Williams et al. ............... 74/422 |
| 5,672,855 | A | * | 9/1997 | Uchiyama et al. .......... 200/61.3 |
| 5,837,961 | A | | 11/1998 | Miller |
| 6,326,587 | B1 | | 12/2001 | Candineau et al. |
| 6,472,623 | B1 | * | 10/2002 | Hayashi .................... 200/61.27 |

* cited by examiner

*Primary Examiner*—Elvin Enad
*Assistant Examiner*—Lheiren Mae A Anglo
(74) *Attorney, Agent, or Firm*—David P. Wood

(57) ABSTRACT

An indicator device for vehicles includes a fixed support mounted in the vicinity of a steering column, an actuation lever, a moveable finger mechanically connected to the actuation lever, and safety means. In accordance with an embodiment of the invention, the moveable finger is mounted on the fixed support slidingly between a position of engagement of its free end, pivoting of the moveable finger being possible only in the engagement position. Return means are provided to return the finger into its disengaged position. The moveable finger and the fixed support each include an indexing surface, and the two surfaces are superimposed as to co-operate with an elastic push button on the end of the actuation lever.

11 Claims, 7 Drawing Sheets

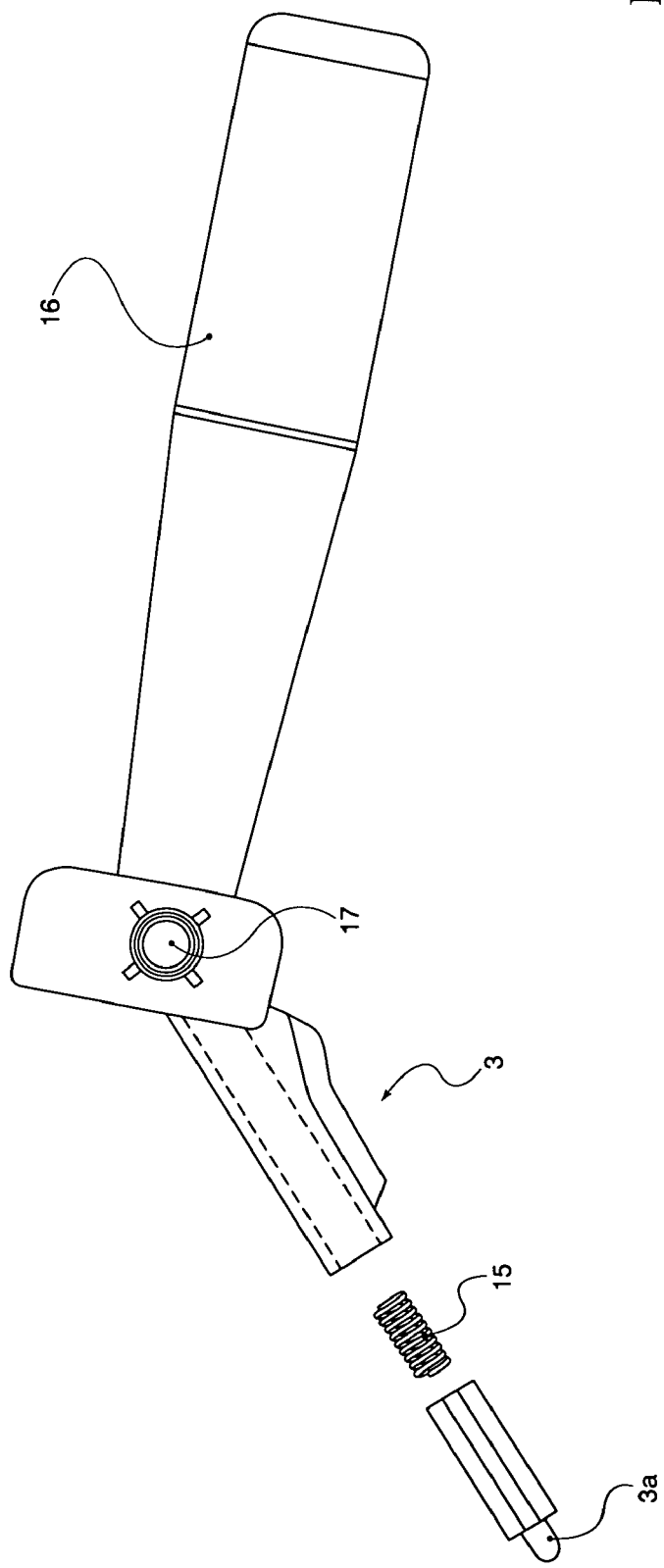

DIRECTION CHANGE DEVICE FOR MOTOR VEHICLE

BACKGROUND OF THE INVENTION

This invention relates generally to stripping insulation from an insulated electric wire and more particularly to center stripping insulation from the insulated electric wire.

U.S. Pat. No. 3,953,706 (Harris et al.) discloses a device for laser stripping insulation from the end portion of an electric wire without damage to the conductor portion of the electric wire. The device includes a rotatable optical unit that produces a circumferential cut in the insulation. The device may be used to produce a longitudinal cut or a spiral cut that extends from the circumferential cut to the end of the electric wire.

U.S. Pat. No. 5,837,961 (Miller) discloses a laser stripping apparatus comprising a plurality of mirrors for alternatively directing a laser beam from a source over a first portion of an insulated electric wire and then an opposite portion of the insulated electric wire to permit removal of an end segment of the insulation as shown in the simplified system diagram of FIG. 1. The laser stripping apparatus is shown in detail in FIGS. 3-12 of the patent drawing. Column 9, line 59 through column 10, line 12 of the patent specification describes the laser stripping and removal of the end piece of insulation from the insulated wire 146 in connection with FIG. 7 of the patent drawing.

U.S. Pat. No. 6,326,587 (Candineau et al.) discloses an apparatus using a laser beam for removing or ablating an insulation layer from a center portion of an insulated electric wire as shown in FIGS. 5 and 6 of the Candineau et al. '587 patent. The laser beam ablates the insulation coating on one side of the exposed coil. According to the Candineau et al., '587 patent specification, sufficient light is transmitted past the insulated electric wire toward the opening by a reflector so that the insulating coating is virtually ablated from the opposite side of the exposed wire. See column 8, line 66 through column 8, line 2 of the Candineau et al. '587 patent specification.

and safety means guaranteeing the integrity of the device in the case of forced maintenance of the actuation lever in a left or right position on rotation of the drive organ in the opposite direction.

By way of example, change of direction indicator devices are known incorporating a safety mechanism to guarantee the integrity of its component elements in case of forced maintenance of the actuation lever in a lateral position. However, this mechanism is not free from disadvantages. It does in fact include a large number of component pieces in relative movement to each other and each of which provides and performs a very precise function, and the relative positioning of which must be very precise to ensure the reliability of the change of direction indicator device.

The manufacture of these many pieces and mounting them in the vicinity of a steering column requires a considerable amount of time, the obtained assembly, moreover, conferring a relatively large bulk on the indicator device. This can be problematic in many cases, in that there is often only little space available in the vicinity of steering columns. The complexity of the technical solution described also has the disadvantage of being detrimental to the reliability of these change of direction indicator devices. Now, for obvious safety reasons, these must not malfunction during use of the vehicle.

Lastly, the use of a large number of pieces to form these devices contributes to substantially increasing their cost price, which makes them economically unattractive.

The aim of the present invention is to remedy the above-mentioned disadvantages and in particular to improve their reliability.

A further aim of the invention is to reduce the number of pieces used and to simplify their assembly. These measures, which lower the costs of manufacture and assembly, have a very favourable impact at the economic level.

In accordance with a further objective, the invention is lastly intended to reduce the bulk of such indicator devices, which simplifies upper steering column space management, which space is increasingly crowded by multiplication of the functions employed in current cars.

To meet these objectives, in accordance with the invention:
the moveable finger is mounted on the fixed support slidingly between a position of engagement of its free end with the drive organ and a disengaged position;
the moveable finger is mounted to pivot on the fixed support, pivoting only being possible in the engagement position to disengage its free end from the drive organ at the limit of pivot;
return means are provided to bring the moveable finger on the one hand into its disengaged position and on the other into an engaged lateral position;
the moveable finger and the fixed support each include an indexing surface, the two surfaces being superimposed so as to co-operate with a push button on the end of the actuation lever;
the moveable and fixed indexing surfaces respectively include cavities and hollows intended on the one hand to provide stable positioning of the lever in the central and lateral positions, these last causing the moveable finger to slide into its engagement position, and on the other to return the lever into the central position from a lateral position by rotation of the finger and therefore of the moveable indexing surface on rotation of the steering column in the opposite direction to that of the lever; and
the push button is elastically retractable to permit forced maintenance of the lever in a lateral position, despite the change of rotation of the steering column.

A technical solution is thus obtained which is considerably more compact and easy to assemble in the vicinity of the upper steering column. The simplicity of forms and the quality resulting from the mutual interactions of the component pieces of the device in accordance with the invention greatly contribute to improving its reliability and the duration of its lifetime.

The elastic push button, which in fact forms the connection between the lever and the moveable finger, has a sufficient travel to absorb displacement of the contact cams arranged at the two ends of the moveable indexing surface and bearing against the push button on displacement of the said moveable indexing surface intended to return the lever into the central position while it is locked in a lateral position.

Preferably, the said elastic push button is guided to slide axially in the lever.

In accordance with an example embodiment, the elastic push button is a rigid contact organ connected to a spring integrated in the actuation lever. The elastic push button, being displaced on the fixed indexing surface, also permits feedback of sensory information to the user manipulating the actuation lever.

The moveable finger, which forms the mechanical connection between the lever and the steering column is guided in translation and to pivot by the fixed support. There is consequently only one piece which moves relative to the fixed support, outside the actuation lever.

To this end, it presents two studs extending beyond and at right-angles to the plane of displacement of the moveable finger and engaged in a groove formed in the fixed support, a first portion of the groove being used for translation of the finger by simultaneous sliding of the two studs and a second portion of the groove, substantially at right-angles to the first portion and communicating with it, being used for sliding of only one of the studs on completion of translation of the two studs in the first portion, thus causing pivoting of the moveable finger. The moveable finger is therefore guided in remarkably simple manner, since the groove and the two studs can, by themselves, implement sliding and rotation sequentially.

In accordance with an example embodiment, the groove is conformed passing through the fixed support. For the double guiding which it performs, the groove is preferably substantially T-shaped. This configuration is simple and easy to produce.

One of the innovative aspects, as it is a simplification, of the invention consists of the double indexing surface and the possibility of co-operation between the two surfaces.

To fulfil their respective functions, the fixed indexing surface and the moveable indexing surface are located on a respective edge surface of the support and of the moveable finger, orientated at right-angles to the plane of their relative displacements. These edge surfaces are so superimposed as to co-operate simultaneously or individually with the elastic push button, depending on the positioning of the moveable finger and of the actuation lever relative to the fixed support.

More precisely, the fixed indexing surface is composed for example of three juxtaposed hollows of the same depth, able to accommodate the elastic push button, and the moveable indexing surface includes three cavities, flanked by the contact cams, the central cavity of which is deeper than the lateral cavities and is exactly superimposed on the central hollow of the fixed indexing surface when the moveable finger is at rest, positioning the lateral cavities projecting from the support.

When the lever adopts one of the lateral positions, it pushes the said lateral cavities so that their bottoms are superimposed on those of the lateral hollows of the fixed indexing surface, leading to displacement in translation of the moveable finger by sliding of the studs in the first portion of the groove.

It is of course necessary that, on return of the lever into the central position or in the absence of interaction with the steering column, the whole system should return to a stable rest position, and it is for this reason that the return means exist. In accordance with the invention, the elastic organ is a spring comprising a central portion housed in a channel and bearing on a shoulder of the moveable finger, and two elastic lateral portions fixed to the support in a position on the near side of its connection to the moveable finger, so as to give the spring a curved configuration.

Such an organ provides return both in translation and rotation, since it is capable of applying return forces which can be resolved into a component parallel to the direction of translation of the moveable finger and a component which is perpendicular to it, in particular due to its configuration in an arc of circle.

In accordance with one possible configuration, the actuation lever is mounted to pivot on a plate rigidly attached to the fixed support. The compactness of the device in accordance with the invention is thus improved.

Other characteristics and advantages will also become apparent from the following detailed description, with reference to the drawings attached as non-limiting examples in which:

FIG. 9 shows an example embodiment of an actuation lever;

Figure 1:
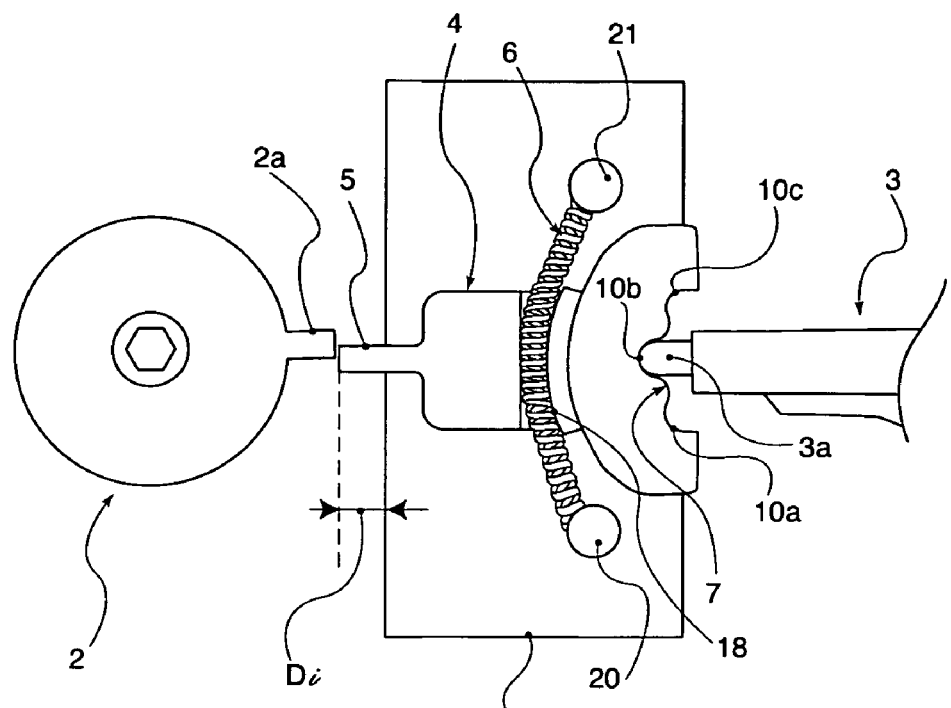
FIG. 1 shows a view from above of an example embodiment of an indicator device in accordance with the invention.
Figure 2:
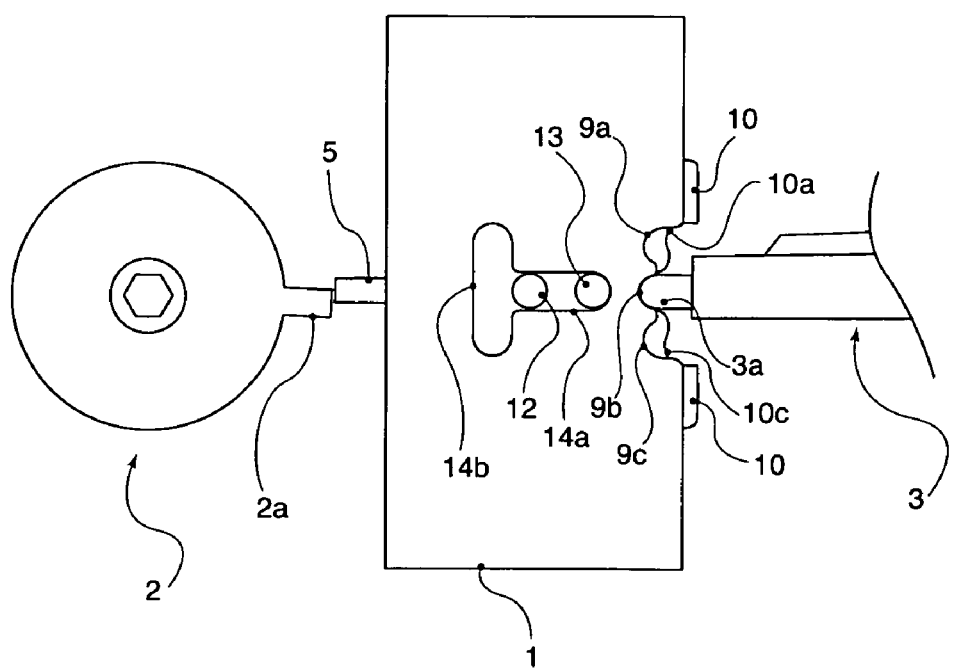
FIG. 2 shows a view from below of the indicator device of FIG. 1.

The change of direction indicator device for a vehicle shown diagrammatically for example in FIGS. 1 and 2 includes a fixed support (1) mounted in the vicinity of a steering column (2). The device also includes an actuation lever (3) mechanically connected to the fixed support (1) and displaceable between respective stable central, left and right positions. These positions correspond to displacement for example by pivoting of the actuation lever (3) between a central position for which no change of direction indicator is activated and active left and right lateral positions, for which a corresponding indicator is activated, for example to indicate a change of direction.

The device in accordance with the invention also includes a moveable finger (4) also called a crossbow, in mechanical connection with the actuation lever (3). A free end (5) of the moveable finger (4) co-operates with a drive organ (2a) rotating with the steering column (2). Thus, the drive organ (2a) has the function of returning the operating lever (3) into its central position from a left or right position in case of rotation of the said drive organ (2a) in the opposite direction to the previous displacement of the actuation lever (3).

Figure 3:
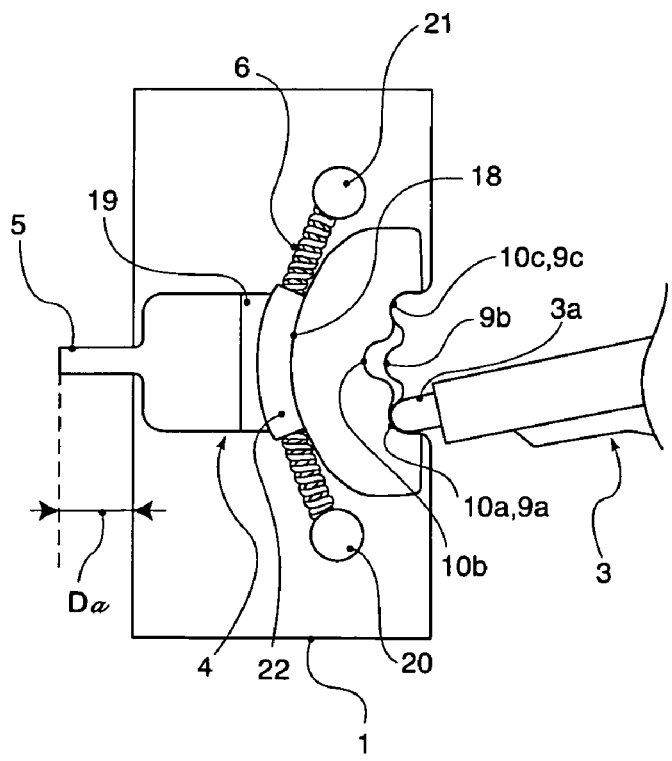
FIG. 3 shows a view from above of an indicator device in accordance with the invention when the lever is actuated laterally.

By positioning the actuation lever (3) for example in a left position shown diagrammatically in FIG. 3, the moveable finger (4) is so displaced in translation that the free end (5) has a spacing ($D_a$) relative to the fixed support (1). The spacing ($D_a$) is for example greater by 3 mm than a spacing ($D_i$) relative to the fixed support (1) corresponding to central positioning of the actuation lever (3), shown diagrammatically for example in FIGS. 1 and 2. Under this hypothesis, the steering column (2) and the drive organ (2a) can turn freely without abutting against the free end (5) of the moveable finger (4).

The device of the invention also includes safety means guaranteeing the integrity of the device in case of forced maintenance of the actuation lever (3) in a left or right position, when the drive organ (2a) is rotated in the opposite direction, in order to prevent damage to it or its component elements.

Figure 4:
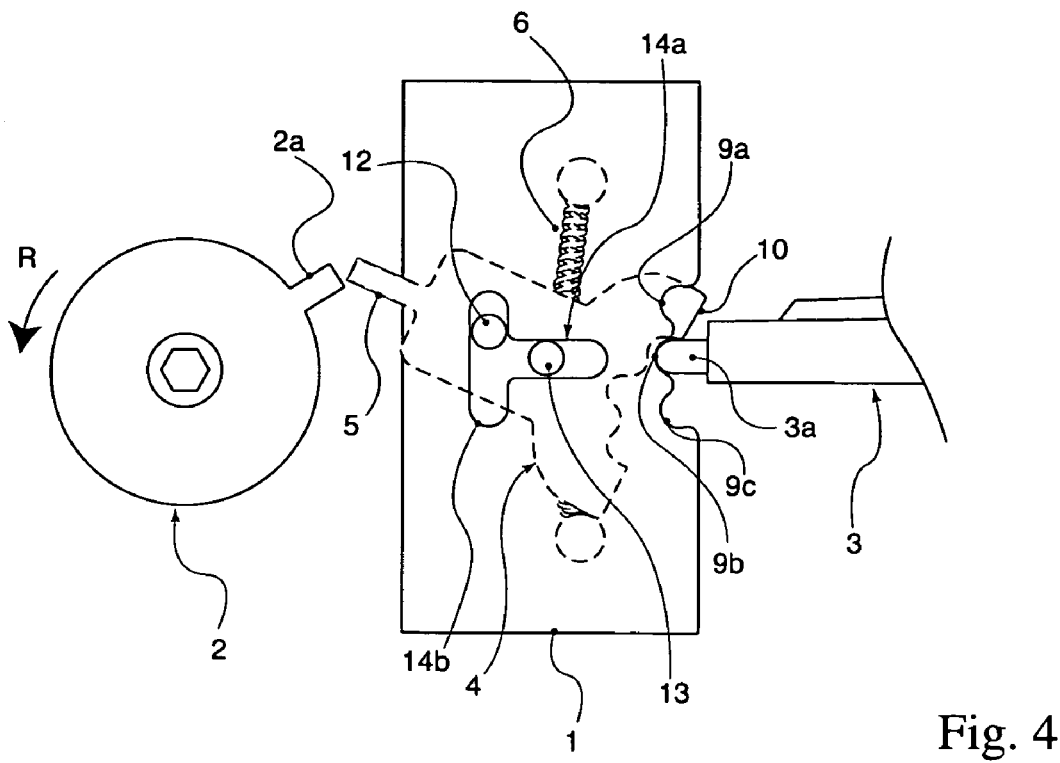
FIG. 4 is a view from below of the same indicator device in another operating state, the lever returned to the central position by the moveable finger following a change of direction of rotation of the steering column.
Figure 5:
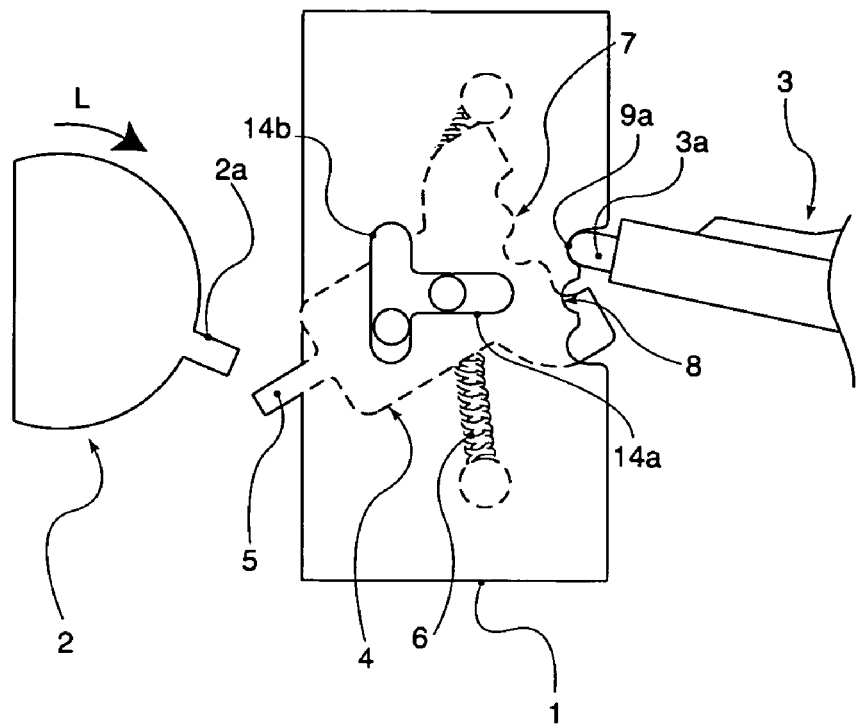
FIG. 5 shows a view from below of the behaviour of the indicator device in the absence of change of direction of the upper column, the lever consequently remaining in the lateral position.

With reference to FIG. 4, the moveable finger (4) returns the actuation lever (3) into its central position on rotation of the steering column (2) in the direction R which corresponds to the opposite direction to that implied in principle by the lateral position of the lever (3). FIG. 5 shows the absence of interaction between the moveable finger (4) and the actuation lever (3) when the steering column (2) rotates in the direction which corresponds to the lateral position of the lever (3). The drive organ (2a), rotating in the direction marked L, abuts against the free end (5) and pivots the moveable finger (4) without affecting the position of the lever (3).

Figure 6:
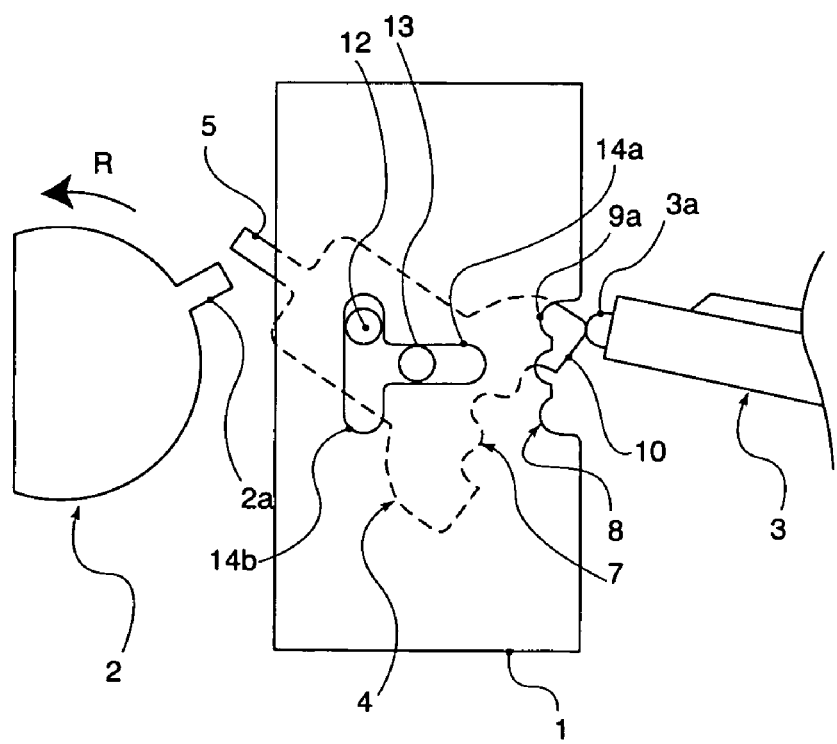
FIG. 6 is a view from below showing the lever in a forced lateral position while the moveable finger is actuated following a change in direction of rotation of the steering column.

FIG. 6 shows the displacement of the moveable finger (4) on forced maintenance of the actuation lever (3), when the column (2) rotates in the opposite direction R. The particular interaction of the lever (3) and the finger (4) under this hypothesis is clearly shown (see more detailed explanation below).

The moveable finger (4) is mounted slidingly and to pivot on the fixed support (1). An elastic organ (6) permits its return into its engageable position (see FIG. 3) on return of a left or right rotation following rotation of the steering column (2) in the opposite direction to the rotation corresponding to the lateral position of the lever (3). Return of the lever (3) into the central position also triggers return of the moveable finger (4) to its initial disengaged position.

The moveable finger (4) includes an indexing surface (7) on which is displaced an elastic push button (3a) of the actuation lever (3). The indexing surface (7), moveable with the finger (4), is associated with a fixed indexing surface (8) of the fixed support (1) on which the elastic push button (3a) is also displaced. The latter is mounted on the actuation lever (3) and can therefore be displaced simultaneously on the two indexing surfaces (7) and (8) as a function of the displacements and positions of the moveable finger (4) and of the actuation lever (3).

The fixed indexing surface (8) presents a left hollow (9a), a central hollow (9b) and a right hollow (9c) permitting definition of the discrete and stable positions corresponding respectively to the left, central and right positions of the actuation lever (3). The moveable indexing surface (7) presents a left cavity (10a), a central cavity (10b) and a right cavity (10c) in which the elastic push button (3a) is also accommodated, thus defining a stable position of the moveable finger (4) relative to the actuation lever (3) on the one hand and relative to the fixed support (1) on the other (see FIG. 3).

By way of example, FIG. 5 shows the positioning of the elastic push button (3a) in the left hollow (9a) while FIG. 4 shows the elastic push button (3a) returned to its central position, corresponding to the central hollow (9b), by means of a localised contact cam (10) on the finger (4), at each end of the moveable indexing surface (7). The inside edge of each contact cam (10) more precisely forms the outside of the left cavity (10a) and of the right cavity (10c) respectively. They are also the contact cams (10) which return the actuation lever into its central position.

The elastic push button (3a) is provided to absorb a displacement caused by the action of the contact cams (10) when the free end (5) is driven by the drive organ (2a) on a change of direction of rotation of the column (2) and when the lever (3) is maintained laterally by force. The said contact cams (10) and the elastic push button (3a) in fact constitute the safety means (10, 3a) in case of forced maintenance of the actuation lever (3) in a left or right position such as for example shown in FIG. 6.

The moveable finger (4) is guided in translation and to pivot by the fixed support (1). Mounting of the moveable finger (4) on the fixed support (1) is effected extremely simply to the extent that no intermediate piece is necessary. For this purpose, the moveable finger (4) presents two studs (12, 13) extending at right-angles to its plane of displacement. These two studs (12, 13) are engaged in a groove (14) formed in the fixed support (1).

A first portion (14a) of the groove (14) is used for the simultaneous displacement in translation of the two studs (12, 13). A second portion (14b) of the groove (14), substantially at right-angles to the first portion (14a) and communicating with it, is used for the displacement in translation of only one of the studs (12) on completion of simultaneous displacement in translation of the two studs (12, 13), giving the moveable finger (4) a pivoting movement about the stud (13). The groove (14) thus forms a simple guiding means for the moveable finger (4).

In accordance with one example embodiment, the groove (14) is conformed passing through the fixed support (1), and it has for example a T-shape.

The fixed indexing surface (8) and the moveable indexing surface (7) are positioned at right-angles to the support (1), their functional surfaces forming two superimposed edge surfaces of the support (1) and of the moveable finger (4) respectively, their superimposition allowing them to co-operate simultaneously or individually with the elastic push button (3a). This co-operation occurs as a function of the positioning of the moveable finger (4) and of the actuation lever (3) relative to the fixed support (1).

The elastic push button (3a) is for example formed of a rigid contact organ biased by a spring (15) integrated in the actuation lever (3). FIG. 9 shows in exploded form an example embodiment of the actuation lever (3) provided with an operating handle (16). This is connected to the actuation lever (3) by a hinge (17), intended to mount the lever (3) pivotably on the fixed support (1) or on a plate (1') rigidly attached to this. This assembly is shown for example in FIGS. 7 and 8.

Figure 16:
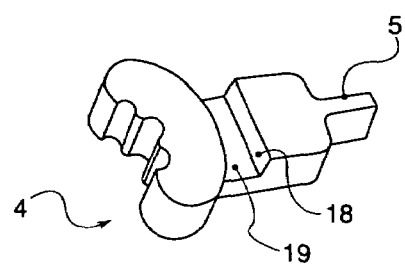
Figure 10:
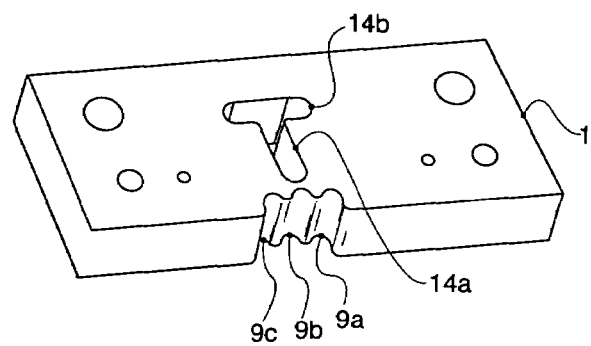
FIGS. 10 and 11 show a view from above and in perspective of the support of the indicator device of the invention.
Figure 11:
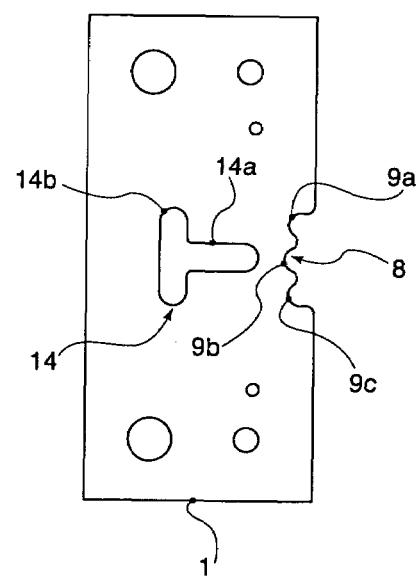

The return means (6) are for example a spring bearing on a shoulder (18) of a channel (19) of the moveable finger (4), as shown for example in FIGS. 1, 3, or 16. The spring (6) is fixed onto the fixed support (1) at anchoring points (20, 21) situated on either side of the moveable finger (4) and on the near side of its connection to the moveable finger (4), to give it, in co-operation with the shoulder (18), a form in arc of circle allowing it to be active in two perpendicular directions, corresponding to the two portions of the groove (14). The spring (6) has for example turns closer together in its central portion (see FIG. 1). Alternatively, it can for example be covered by a protective sheath (22) in the zone of contact with the shoulder (18). The latter is advantageously curved to improve its co-operation with the spring (6). The prestressed positioning of the spring in an arc of circle thus allows lateral components to be given to the return force, favouring return of the stud (12) into the first portion (14a) of the groove (14).

As a modification, the use may be envisaged of an elastic return means (6) the return force of which is applied essentially in the direction of extension of the first portion (14a) of the groove (14), optimizing the shape of the groove (14) over the whole trajectory of the stud (12) of the first (14a) and second (14b) portions. Such a curved or rounded configuration then favours sliding of the stud (12) from the second portion (14b) to the first portion (14a).

Figure 7:
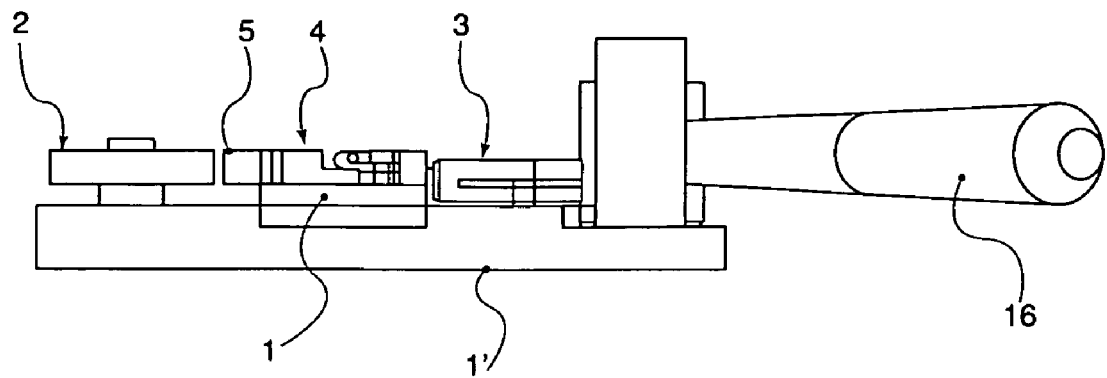
FIGS. 7 and 8 show, from the front and above respectively, an example embodiment of an indicator device with the whole of the actuation lever.
Figure 8:
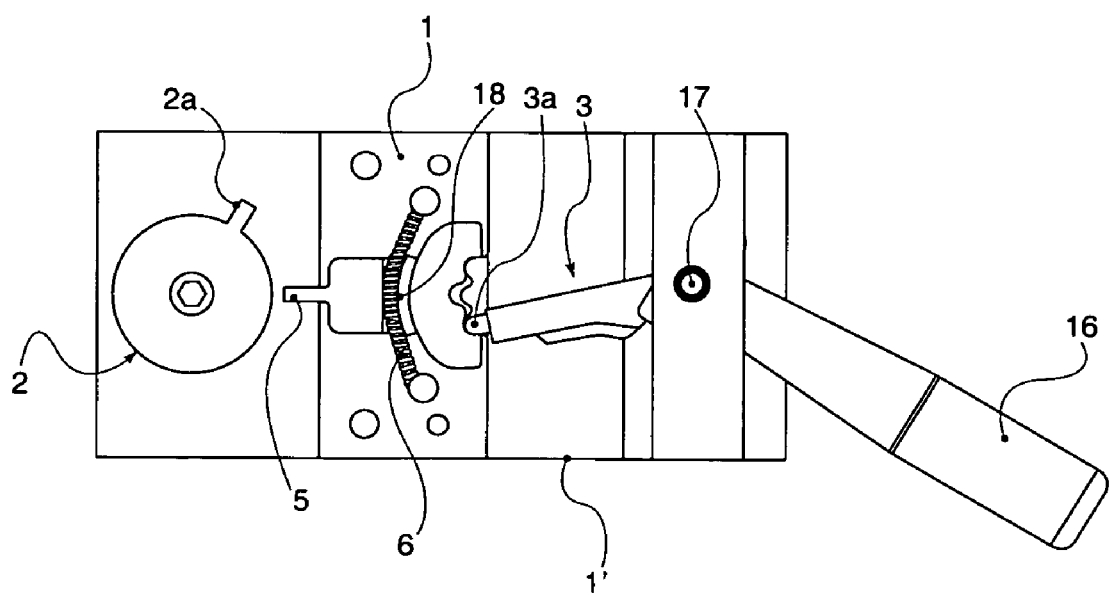
Figure 15:
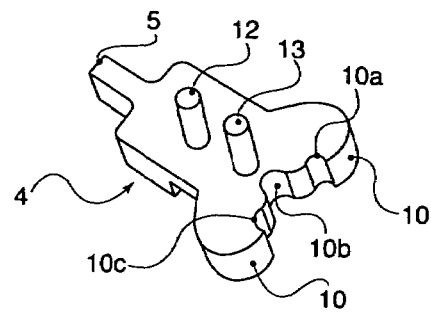
FIGS. 12 to 16 shows different views of the moveable finger.

FIGS. 7 and 8 show diagrammatically a steering column (2) mounted on the plate (1'). It is obvious that, without departing from the scope of the present invention, this embodiment could be replaced by a technical solution in which the steering column (2) extends in the proximity of the fixed plate (1'), and is for example rigidly attached to pieces or elements fixed relative to the fixed plate (1').

Figure 12:
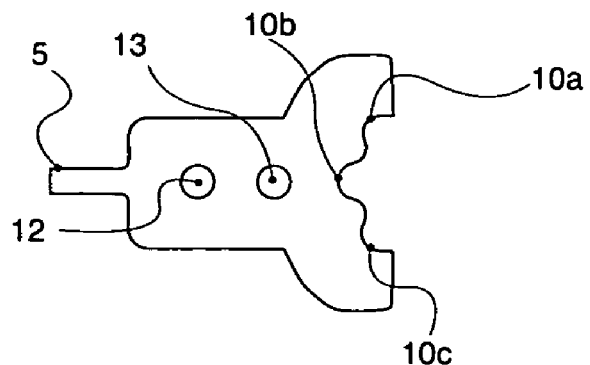
Figure 13:
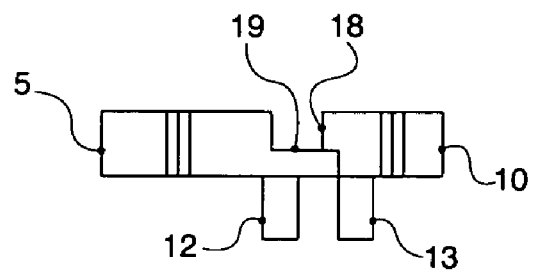
Figure 14:
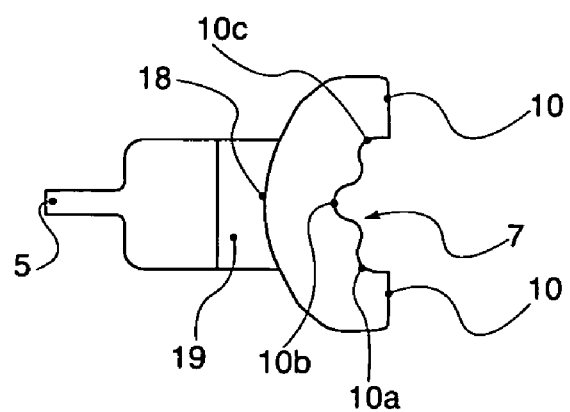

FIGS. 12, 13 and 14 show the moveable finger (4) in accordance with the invention shown from below, from the front and from above respectively.

The indicator device in accordance with the invention functions in the following manner. With reference to FIGS. 1 and 2, the actuation lever (3) is positioned in its central position and the elastic push button (3*a*) is engaged in the central hollow (9*b*) and in the central cavity (10*b*). The elastic push button (3*a*) is in contact simultaneously with the moveable indexing surface (7) and with the fixed indexing surface (8). In this state of operation, the free end (5) extends projecting beyond the fixed support (1) and has a fixed spacing (Di) from the said fixed support (1). In this case, rotation of the steering column (2) and of the drive organ (2*a*) in both directions does not affect the indicator device. The drive organ (2*a*) cannot in fact come into contact with the free end (5). The indicator device in accordance with the invention is shown in this operating state seen from above in FIG. 1 and seen from below in FIG. 2. The central hollow (9*b*) and the central cavity (10*b*) are exactly superimposed and the depth difference allows the lateral cavities (10*a*, 10*c*) to project from the hollows (9*a*, 9*c*) of the fixed support (1), as shown in FIGS. 1 and 2.

When the user of the vehicle requires for example to turn left, the actuation lever (3) is pivoted to the left and the elastic push button (3*a*) is positioned in the left hollow (9*a*). This push button (3*a*) is also engaged in the left cavity (10*a*) of the moveable finger (4). Taking into account the difference in depth of the cavity (10*a*) and of the hollow (9*a*), this engagement causes displacement of the moveable finger (4) in translation against a return force applied by the elastic organ (6), as shown in FIG. 3.

This displacement of the moveable finger (4) causes a correlated displacement of the free end (5) by approximately 3 mm. The end (5) then has a spacing (Da) relative to the end of the fixed support (1). It consequently interferes with the trajectory of the drive organ (2*a*).

When the drive organ (2*a*) rotates in the clockwise direction L corresponding for example to a left turn of the vehicle shown diagrammatically in FIG. 5 seen from below, the drive organ (2*a*) displaces the free end (5) causing the moveable finger (4) to pivot in the opposite direction.

Such pivoting is obtained due to the sliding of the stud (12) in the second portion (14*b*) of the groove (14), the stud (13) acting as a pivot. The pivoting of the moveable finger (4) has no effect on the position of the actuation lever (3), which remains stably housed by means of the elastic push button (3*a*) in the left hollow (9*a*).

Conversely, when the steering column (2) and the drive organ (2*a*) rotate in the anti-clockwise direction R, corresponding to a change of direction of rotation of the steering column (2), the state of operation is again that shown diagrammatically in FIG. 4. The drive organ (2*a*) causes the moveable finger (4) to pivot in the opposite direction, again by means of the stud (12) being displaced in the second portion (14*b*) of the groove (14) after the two studs (12, 13) have been pushed towards the column (2), but short of abutment. The moveable finger (4), acting by means of the internal side of the contact cam (10), returns the actuation lever (3) into its central position (9*b*). The elastic push button (3*a*) therefore becomes accommodated in the central hollow (9*b*) and when the drive organ (2*a*) releases the end (5), the moveable finger (4) returns to its initial position due to the spring, which returns the stud (12) to the first portion (14*a*) of the groove (14). This is again the state of operation shown in FIGS. 1 and 2.

In the state of operation of the indicator device shown diagrammatically in FIG. 6, this is again the same situation as that shown diagrammatically in FIG. 4 with, however, forced maintenance of the actuation lever (3) in the position corresponding to engagement of the elastic push button (3*a*) in the left hollow (9*a*). Such maintenance may for example be associated with lack of attention by the driver. When the drive organ (2*a*) rotates in the anti-clockwise direction R, in the same way as shown in FIG. 4, the moveable finger (4) cannot return the actuation lever (3) to its central position corresponding to engagement of the elastic push button (3*a*) in the central hollow (9*b*). The rotation of the drive organ (2*a*) then causes an additional displacement of the moveable organ (4), in such a way that the stud (12) comes against the stop of the portion (14*b*) of the groove (14) or in the direction of this stop. The additional pivoting of the organ (4) then displaces the contact cam (10) on the elastic push button (3*a*).

The elastic push button (3*a*) is designed to absorb the additional displacement resulting from contact with the cam (10) which leads to further compression of the spring (15). In this position of the moveable finger (4), the trajectory of the drive organ (2*a*) is freed from the free end (5). When the drive organ (2*a*) is no longer in engagement with the free end (5), the moveable finger (4) is returned by the spring (6) into its central position after pivoting of the finger (4) in the opposite direction, by displacements in translation of the stud (12) in the groove (14*b*). The actuation lever (3) having remained immobile during this last phase, the elastic push button (3*a*) goes back into the left hollow (9*a*) as shown in FIG. 3.

The device in accordance with the invention has the not inconsiderable advantage of providing with extremely simple means on the one hand a mechanism for automatic return of the actuation lever (3) into the central position, and on the other a safety mechanism guaranteeing proper operation of the device in the case of forced maintenance of the said actuation lever (3) in a lateral position.

The invention claimed is:

1. A change of direction indicator device for vehicles including:
    a fixed support mounted in the vicinity of a steering column;
    an actuation lever mechanically connnected to the fixed support and displaceable between stable central and left and right lateral positions, the lateral positions being positions in which an indicator is activated, the central position being a position in which neither indicator is activated;
    a moveable finger mechanically connected to the actuation lever and the positions of which on the support are determined by the positions of the actuation lever, the free end of the moveable finger being able to co-operate with a drive organ rotating with the steering column when the actuation lever is in its left or right position so as to return it to its central position in case of rotation of the drive organ in the direction opposite to the preceding displacement of the actuation lever; and
    safety means guaranteeing the integrity of the device in the ease of forced maintenance of the actuation lever in a left or right position on rotation of the drive organ in the opposite direction;
    wherein the moveable finger is mounted on the fixed support slidingly between a position of engagement of the free end with the drive organ and a disengaged position;
    wherein the moveable finger is mounted to pivot on the fixed support, pivoting being possible only in the engagement position to disengage the free end from die trajectory of the drive organ at the limit of pivot;

further comprising return means configured to bring the moveable finger on the one band into its disengaged position and on the other into an engaged lateral position;

wherein the moveable finger and the fixed support each include an indexing surface, the two surfaces being superimposed so as to co-operate with a push button on the end of the actuation lever;

wherein the moveable and fixed indexing surfaces respectively include cavities and hollows intended on the one hand to provide stable positioning of the lever in the central and lateral positions, these last causing the moveable finger to slide into its engagement position, and on the other to ensure the return of the lever into the central position from a lateral position by rotation of the finger and therefore of the moveable indexing surface on rotation of the steering column in the opposite direction to that of the lever; and wherein the push button is elastically retractable to permit forced maintenance of the lever in a lateral position, despite the change of rotation of the steering column.

2. An indicator device as described in claim 1, wherein the elastic push button has sufficient travel to absorb displacement of the contact cams arranged at the two ends of the moveable indexing surface and bearing against the push button on displacement of the said moveable indexing surface intended to return the lever into the central position while it is held in a lateral position.

3. An indicator device as described in claim 1, wherein the elastic push button is guided to slide axially in the lever.

4. An indicator device as described in claim 1, wherein the elastic push button is a rigid contact organ connected to a spring integrated in the actuation lever.

5. An indicator device as described in claim 1, wherein the moveable finger presents two studs extending at right-angles to the plane of displacement of the moveable finger and engaged in a groove fanned in the fixed support, a first portion of the groove being used for the translation of the finger by simultaneous sliding of the two studs and a second portion of the groove, substantially at right-angles to the first portion and communicating with it, used for sliding of only one of the studs on completion of the translation of the two studs in the first portion, thus causing pivoting of the moveable finger.

6. An indicator device as described in claim 5, wherein the groove is conformed passing through the fixed support.

7. An indicator device as described in claim 5, wherein the groove is substantially T-shaped.

8. An indicator device as described in claim 1, wherein the fixed indexing surface and the moveable indexing surface are located respectively on an edge surface of the support and of the moveable finger, orientated at right-angles to the plane of their relative displacements, the said edge surfaces being so superimposed as to co-operate simultaneously or individually with the elastic push button, depending on the positioning of the moveable finger and of the actuation lever relative to the fixed support.

9. An indicator device as described in claim 1, wherein the fixed indexing surface is composed of three juxtaposed hollows of the same depth able to accommodate the elastic push button, and the moveable indexing surface includes three cavities the central cavity of which is deeper than the lateral cavities and is exactly superimposed on the central hollow of the fixed indexing surface when the moveable finger is at rest, positioning the lateral cavities projecting from the support.

10. An indicator device as described in claim 1, wherein the elastic organ is a spring comprising a central portion housed in a channel and bearing on a shoulder of the moveable finger, and two lateral portions fixed to the support in a position located on the near side of its connection to the moveable finger, so as to give the spring a curved configuration.

11. An indicator device as described in claim 1, wherein the actuation lever is mounted to pivot on a plate rigidly attached to a fixed support.

* * * * *